(12) United States Patent
Labrecque et al.

(10) Patent No.: US 12,103,695 B2
(45) Date of Patent: Oct. 1, 2024

(54) EXHAUST NOZZLE ASSEMBLY FOR AN AIRCRAFT PROPULSION SYSTEM

(71) Applicant: Pratt & Whitney Canada Corp., Longueuil (CA)

(72) Inventors: Michel Labrecque, Sainte-Julie (CA); Kevin Nguyen, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/948,870

(22) Filed: Sep. 20, 2022

(65) Prior Publication Data

US 2024/0092496 A1    Mar. 21, 2024

(51) Int. Cl.
| | | |
|---|---|---|
| B64D 33/04 | (2006.01) | |
| B64D 27/10 | (2006.01) | |
| B64D 29/00 | (2006.01) | |
| F02K 1/06 | (2006.01) | |
| F02K 1/08 | (2006.01) | |
| F02K 1/09 | (2006.01) | |
| F02K 1/36 | (2006.01) | |

(52) U.S. Cl.
CPC .............. *B64D 33/04* (2013.01); *B64D 27/10* (2013.01); *B64D 29/00* (2013.01); *F02K 1/06* (2013.01); *F02K 1/08* (2013.01); *F02K 1/09* (2013.01); *F02K 1/36* (2013.01)

(58) Field of Classification Search
CPC ..... F02K 1/06; F02K 1/09; F02K 1/36; F02K 1/08; B64D 33/04
See application file for complete search history.

(56) References Cited

U.S. PATENT DOCUMENTS

| | | | |
|---|---|---|---|
| 3,591,087 A | 7/1971 | Tontini | |
| 3,599,875 A | 8/1971 | Wynosky | |
| 4,501,393 A | 2/1985 | Klees | |
| 4,527,388 A * | 7/1985 | Wallace, Jr. .............. | F02K 1/09 |
| | | | 239/265.33 |
| 6,164,563 A | 12/2000 | Bouiller | |
| 6,282,881 B1 | 9/2001 | Beutin | |
| 7,174,704 B2 | 2/2007 | Renggli | |

(Continued)

OTHER PUBLICATIONS

Wikipedia, Fadec, Mar. 21, 2020 (Year: 2020).*
EP Search Report for EP Patent Application No. 23198656.3 dated Feb. 19, 2024.

*Primary Examiner* — Kyle Robert Thomas
(74) *Attorney, Agent, or Firm* — Getz Balich LLC

(57) ABSTRACT

An exhaust nozzle assembly for a propulsion system include a primary nozzle, an outer shroud, an ejector nozzle, and an actuator. The primary nozzle extends along an exhaust centerline. The primary nozzle includes a downstream axial end. The outer shroud surrounds the primary nozzle. The ejector nozzle extends axially between a first axial end and a second axial end. The second axial end forms a nozzle exit plane for the exhaust nozzle assembly. The ejector nozzle converges in a direction from the first axial end to the second axial end. The ejector nozzle forms a mixing cross-sectional area between the primary nozzle and the ejector nozzle at the downstream axial end. The actuator is mounted on the ejector nozzle. The actuator is configured to move the ejector nozzle between a first position and a second position, relative to the outer shroud, to control an area of the mixing cross-sectional area.

20 Claims, 4 Drawing Sheets

(56) References Cited

U.S. PATENT DOCUMENTS

| | | |
|---|---|---|
| 8,459,036 B2 | 6/2013 | Baker |
| 10,087,884 B2 * | 10/2018 | Peters ................... F02K 1/1223 |
| 10,738,735 B2 * | 8/2020 | Todorovic ............... B64C 30/00 |
| 2006/0016171 A1 * | 1/2006 | Renggli .................. F02K 1/386 |
| | | 60/204 |

* cited by examiner

EXHAUST NOZZLE ASSEMBLY FOR AN AIRCRAFT PROPULSION SYSTEM

TECHNICAL FIELD

This disclosure relates generally to exhaust systems for aircraft propulsion systems and, more particularly, to exhaust nozzle assemblies.

BACKGROUND OF THE ART

An exhaust nozzle assembly for an aircraft propulsion system may include one or more nozzles for directing exhaust gas from the propulsion system to the surrounding atmosphere. Various configurations of exhaust nozzle assemblies are known in the art. While these known exhaust nozzle assemblies have various advantages, there is still room in the art for improvement. There is a need in the art, therefore, for an improved exhaust nozzle assembly.

SUMMARY

It should be understood that any or all of the features or embodiments described herein can be used or combined in any combination with each and every other feature or embodiment described herein unless expressly noted otherwise.

According to an aspect of the present disclosure, an exhaust nozzle assembly for a propulsion system include a primary nozzle, an outer shroud, an ejector nozzle, and an actuator. The primary nozzle extends along an exhaust centerline of the exhaust nozzle assembly. The primary nozzle includes a downstream axial end. The outer shroud surrounds the primary nozzle. The outer shroud forms a secondary annulus between the primary nozzle and the outer shroud. The ejector nozzle extends axially between a first axial end and a second axial end. The first axial end is disposed at the outer shroud. The second axially end is disposed downstream of the first axial end. The second axial end forms a nozzle exit plane for the exhaust nozzle assembly. The ejector nozzle converges in a direction from the first axial end to the second axial end. The ejector nozzle forms a mixing cross-sectional area between the primary nozzle and the ejector nozzle at the downstream axial end. The actuator is mounted on the ejector nozzle. The actuator is configured to axially move the ejector nozzle between a first axial position and a second axial position, relative to the outer shroud, to control an area of the mixing cross-sectional area. The mixing cross-sectional area has a first area with the ejector nozzle in the first axial position and a second area with the ejector nozzle in the second axial position. The first area is greater than the second area.

In any of the aspects or embodiments described above and herein, the ejector nozzle may include a first converging portion and a second converging portion. The first converging portion may have a first convergence angle relative to the exhaust centerline. The second converging portion may extend axially between and to the first converging portion and the second axial end. The second converging portion may have a second convergence angle relative to the exhaust centerline. The second convergence angle may be different than the first convergence angle.

In any of the aspects or embodiments described above and herein, the first converging portion may form the mixing cross-sectional area with the ejector nozzle in the first axial position.

In any of the aspects or embodiments described above and herein, the second converging portion may form the mixing cross-sectional area with the ejector nozzle in the second axial position.

In any of the aspects or embodiments described above and herein, the ejector nozzle may further include a sleeve portion extending between and to the first axial end and the first converging portion. The sleeve portion may be configured to slidingly contact the outer shroud as the ejector nozzle axially translates between the first axial position and the second axial position.

In any of the aspects or embodiments described above and herein, the second convergence angle may be less than the first convergence angle.

In any of the aspects or embodiments described above and herein, the first converging portion may have a first axial length and the second converging portion may have a second axial length. The second axial length may be greater than the first axial length.

In any of the aspects or embodiments described above and herein, the actuator may additionally be mounted on the outer shroud.

In any of the aspects or embodiments described above and herein, the exhaust nozzle assembly may further include a controller. The controller may include a processor in communication with a non-transitory memory storing instructions, which instructions when executed by the processor, may cause the processor to control the actuator to axially move the ejector nozzle.

In any of the aspects or embodiments described above and herein, the instructions, when executed by the processor, may further cause the processor to control the actuator based on a measured temperature of the propulsion system.

According to another aspect of the present disclosure, a propulsion system includes a gas turbine engine, a nacelle, and an exhaust nozzle assembly. The gas turbine engine extends along an axial centerline of the propulsion system. The gas turbine engine includes a core flowpath. The nacelle houses the gas turbine engine. The nacelle forms a nacelle cavity between the gas turbine engine and the nacelle. The nacelle cavity forms a secondary flowpath. The exhaust nozzle assembly including a primary nozzle, an outer shroud, and an ejector nozzle. The primary nozzle includes a downstream axial end. The primary nozzle forms the core flowpath. The outer shroud surrounds the primary nozzle. The outer shroud forms a secondary annulus between the primary nozzle and the outer shroud. The secondary flowpath includes the secondary annulus. The ejector nozzle is mounted to the outer shroud. The ejector nozzle extends between and to a first axial end and a second axial end. The ejector nozzle forms a mixing cross-sectional area between the primary nozzle and the ejector nozzle at the downstream axial end. The ejector nozzle further forms a mixing region extending axially from the mixing cross-sectional area to the second axial end. The mixing region is in fluid communication with the core flowpath and the secondary flowpath. The ejector nozzle is configured to axially move relative to the outer shroud to vary an area of the mixing cross-sectional area and an axial length of the mixing region.

In any of the aspects or embodiments described above and herein, the ejector nozzle may include a first converging portion and a second converging portion. The first converging portion may have a first convergence angle relative to the axial centerline. The second converging portion may extend axially between and to the first converging portion and the second axial end. The second converging portion may have a second convergence angle relative to the axial centerline. The second convergence angle may be different than the first convergence angle.

In any of the aspects or embodiments described above and herein, the second convergence angle may be less than the first convergence angle.

In any of the aspects or embodiments described above and herein, the first converging portion may have a first axial length and the second converging portion may have a second axial length. The second axial length may be greater than the first axial length.

In any of the aspects or embodiments described above and herein, the ejector nozzle may be positionable in an axially forward position and an axially aft position. The mixing cross-sectional area may have a first area with the ejector nozzle in the axially forward position and a second area with the ejector nozzle in the axially aft position. The second area may be greater than the first area.

In any of the aspects or embodiments described above and herein, the exhaust nozzle assembly may further include an actuator mounted on the ejector nozzle. The actuator may be configured to axially move the ejector nozzle between a forward axial position and an aft axial position to control the area of the mixing cross-sectional area.

According to another aspect of the present disclosure, an exhaust nozzle assembly for a propulsion system includes a primary nozzle, an ejector nozzle, and an actuator. The primary nozzle extends along an exhaust centerline of the exhaust nozzle assembly. The primary nozzle includes a downstream axial end. The ejector nozzle extends axially between first axial end and second axial end. The second axially end is disposed downstream of the first axial end. The second axial end forms a nozzle exit plane for the exhaust nozzle assembly. The ejector nozzle forms a mixing cross-sectional area between the primary nozzle and the ejector nozzle at the downstream axial end. The actuator is mounted on the ejector nozzle. The actuator is configured to axially move the ejector nozzle between a forward axial position and an aft axial position, relative to the primary nozzle, to control an area of the mixing cross-sectional area. The mixing cross-sectional area has a first area with the ejector nozzle in the forward axial position and a second area with the ejector nozzle in the aft axial position. The second area is greater than the first area.

In any of the aspects or embodiments described above and herein, the ejector nozzle may converge in a direction from the first axial end to the second axial end.

In any of the aspects or embodiments described above and herein, the ejector nozzle may include a first converging portion and a second converging portion. The first converging portion may have a first convergence angle relative to the exhaust centerline. The second converging portion may extend axially between and to the first converging portion and the second axial end. The second converging portion may have a second convergence angle relative to the exhaust centerline. The second convergence angle may be different than the first convergence angle.

In any of the aspects or embodiments described above and herein, the first converging portion may form the mixing cross-sectional area with the ejector nozzle in the aft axial position and the second converging portion may form the mixing cross-sectional area with the ejector nozzle in the forward axial position.

The present disclosure, and all its aspects, embodiments and advantages associated therewith will become more readily apparent in view of the detailed description provided below, including the accompanying drawings.

DETAILED DESCRIPTION

Figure 1:
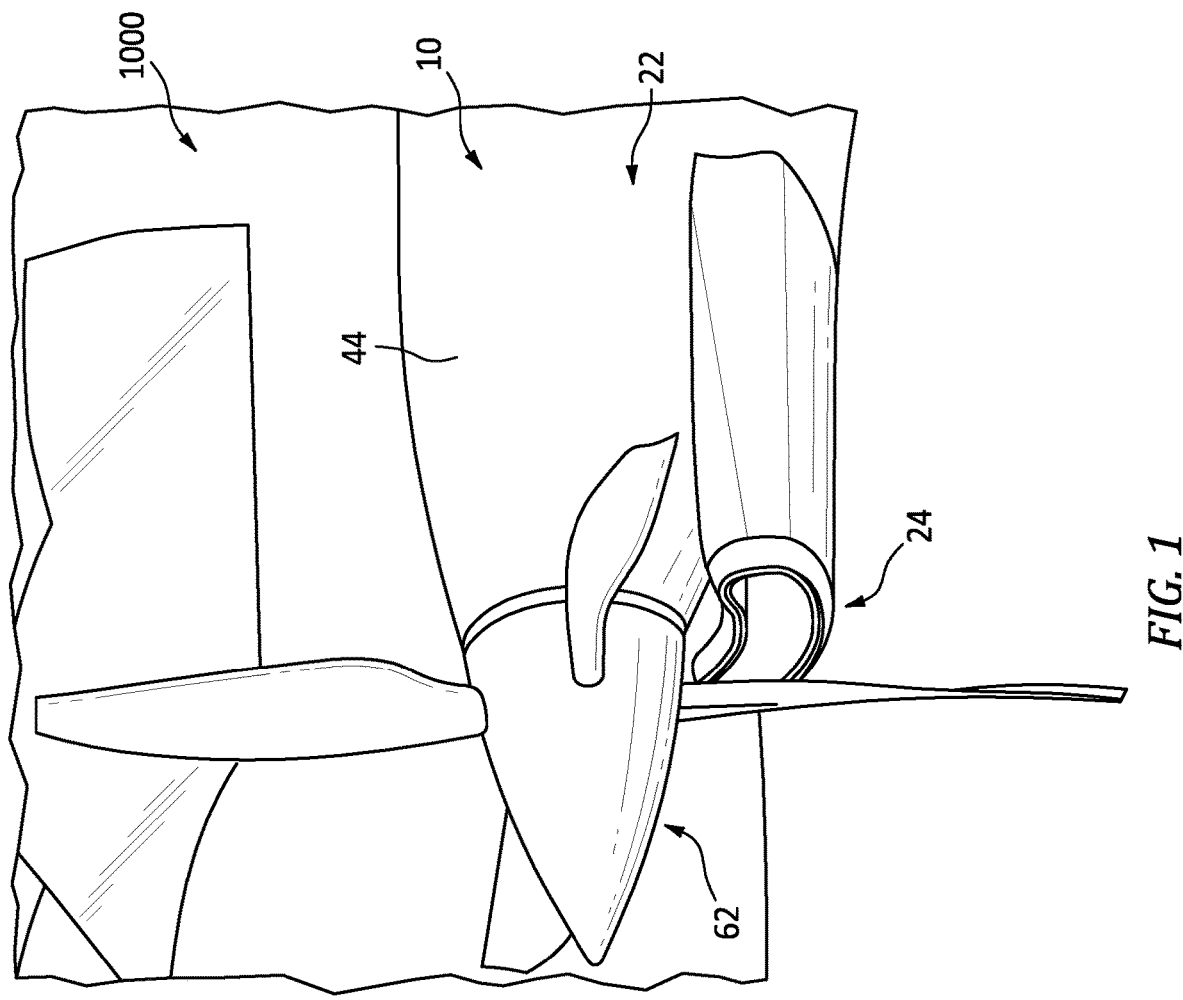
FIG. 1 illustrates a perspective view of a perspective view of a propulsion system for an aircraft, in accordance with one or more embodiments of the present disclosure.
Figure 2:
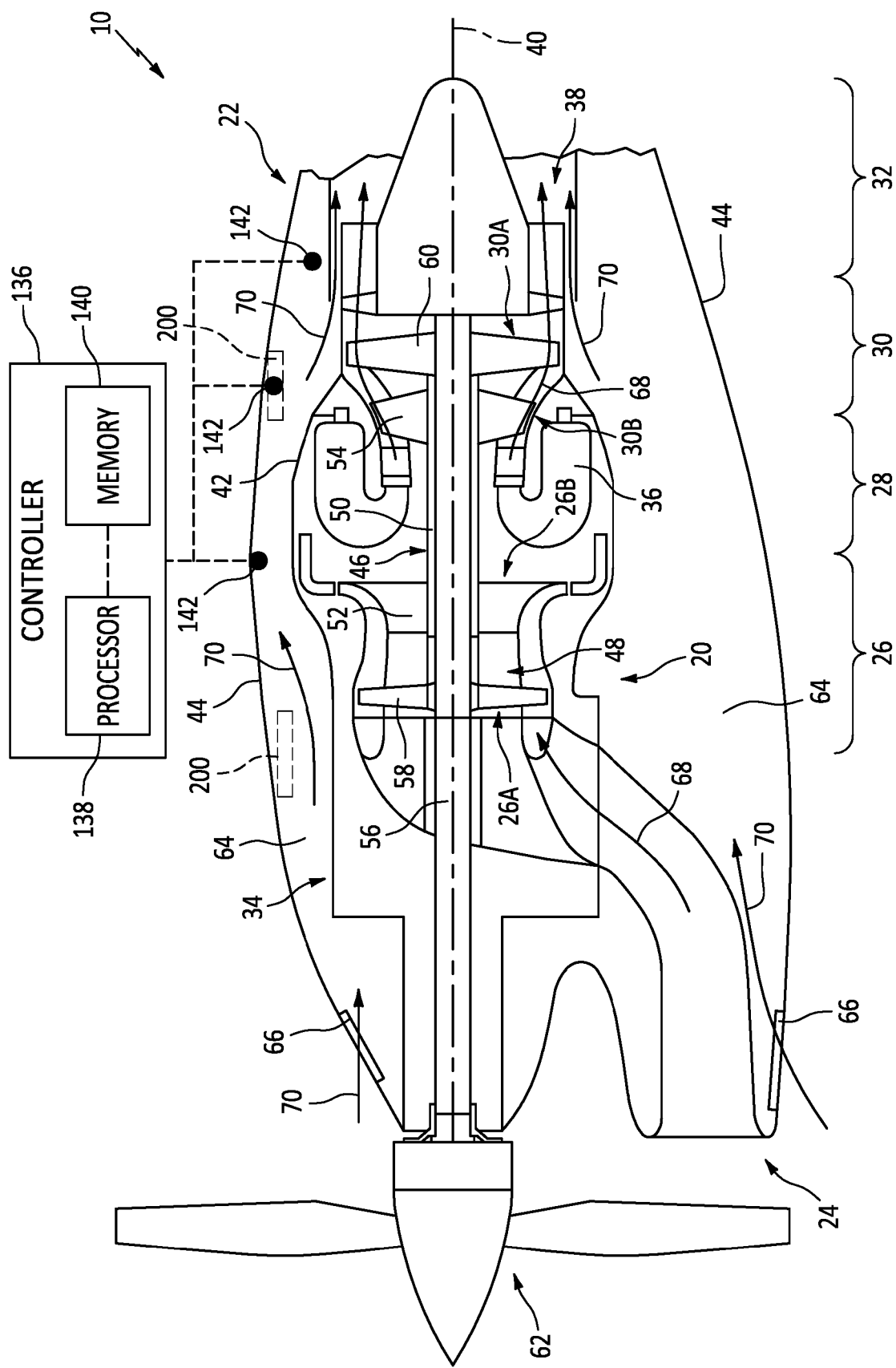
FIG. 2 illustrates a schematic view of the propulsion system of FIG. 1, in accordance with one or more embodiments of the present disclosure.

FIGS. 1 and 2 illustrate a propulsion system 10 for an aircraft 1000. The aircraft propulsion system 10 includes a gas turbine engine 20 and a nacelle 22 (e.g., aircraft propulsion system housing). The propulsion system 10 (e.g., the nacelle 22) may be mounted to or otherwise formed by a portion of the aircraft 1000 such as, but not limited to, a wing or fuselage of the aircraft 1000.

The gas turbine engine 20 of FIGS. 1 and 2 is configured as a turboprop engine. However, the present disclosure is not limited to any particular configuration of gas turbine engine for the propulsion assembly 10, and examples of gas turbine engine configurations for the propulsion system 10 may include, but are not limited to, a turbofan engine, a turbojet engine, a propfan engine, or the like. The gas turbine engine 20 of FIG. 2, for example, includes an air inlet section 24, a compressor section 26, a combustor section 28, a turbine section 30, an exhaust section 32, and an engine static structure 34. The compressor section 26 may include a low-pressure compressor (LPC) section 26A and a high-pressure compressor (HPC) section 26B. The combustor section 28 includes a combustor 36. The turbine section 30 may include a low-pressure turbine (LPT) section 30A and a high-pressure turbine (HPT) section 30B. The exhaust section 32 and components thereof may be formed by portions of the nacelle 22 as well as the gas turbine engine 20. The exhaust section 32 includes an exhaust nozzle assembly 38.

The gas turbine engine 20 sections 26, 28, 30, and 32 of FIG. 2 are arranged sequentially along an axial centerline 40 (e.g., a rotational axis) of the propulsion system 10 within the engine static structure 34. The engine static structure 34 may include, for example, one or more engine cases 42. The engine static structure 34 may additionally include cowlings, bearing assemblies, or other structural components of the gas turbine engine. The one or more engine cases 42 house and/or structurally support one or more of the engine sections 24, 26, 28, 30, and 32. The engine sections 26, 28, 30, and 32 may be collectively referred to as an "engine core."

The gas turbine engine 20 of FIG. 2 includes a first rotational assembly 46 (e.g., a high-pressure spool) and a second rotational assembly 48 (e.g., a low-pressure spool). The first rotational assembly 46 and the second rotational assembly 48 are mounted for rotation about the axial centerline 40 relative to the engine static structure 34.

The first rotational assembly 46 includes a first shaft 50, a bladed first compressor rotor 52, and a bladed first turbine rotor 54. The first shaft 50 interconnects the bladed first compressor rotor 52 and the bladed first turbine rotor 54. The second rotational assembly 48 includes a second shaft 56, a bladed second compressor rotor 58, a bladed second turbine rotor 60, and a propeller 62. The second shaft 56 interconnects the bladed second compressor rotor 58 and the bladed second turbine rotor 60. The second shaft 56 may directly interconnect the propeller 62 with the bladed second compressor rotor 58 and the bladed second turbine rotor 60. Alternatively, the second shaft 56 may be connected to the propeller 62, for example, by one or more speed-reducing gear assemblies (not shown) to drive the propeller 62 at a reduced rotational speed relative to the second shaft 56. The combustor 36 of FIG. 2 is disposed between the bladed first compressor rotor 52 and the bladed first turbine rotor 54 along the axial centerline 40.

The nacelle 22 houses the gas turbine engine 20 and forms and aerodynamic cover for the propulsion system 10. For example, an outer skin 44 of the nacelle 22 of FIG. 2 forms an aerodynamic exterior of the propulsion system 10. The nacelle 22 of FIG. 2 extends circumferentially about (e.g., completely around) the axial centerline 40. The outer skin 44 may be radially spaced from the gas turbine engine 20 to form a nacelle cavity 64 within the propulsion system 10 between the outer skin 44 and the gas turbine engine 20. The nacelle 22 may house or otherwise contain one or more auxiliary systems 200 of the propulsion system 10 such as, but not limited to electronic systems, electrical systems, hydraulic systems, pneumatic systems, sensors, and the like, which auxiliary systems 200 may be configured to control or monitor various operations of the propulsion system 10 or its gas turbine engine 20. The nacelle 22 (e.g., the outer skin 44) may include one or more openings configured to allow ambient air to enter the nacelle 22 and/or the nacelle cavity 64. The nacelle 22 of FIG. 2, for example, includes a plurality of louvers 66 extending through the outer skin 44. The louvers 66 are disposed at (e.g., on, adjacent, or proximate) an upstream end of the nacelle 22.

During operation of the propulsion system 10 of FIG. 2, air enters the propulsion system 10 through the air inlet section 24 and is directed into a core flowpath 68. The core flowpath 68 extends axially through the gas turbine engine 20 sections 26, 28, 30, and 32 of FIG. 2 to the exhaust nozzle assembly 38. The air within the core flowpath 68 may be referred to as "core air." The core air is compressed by the bladed second compressor rotor 58 and the bladed first compressor rotor 52 and directed into a combustion chamber of the combustor 36. Fuel is injected into the combustion chamber and mixed with the compressed core air to provide a fuel-air mixture. This fuel-air mixture is ignited and combustion products thereof flow through and sequentially cause the bladed first turbine rotor 54 and the bladed second turbine rotor 60 to rotate. The rotation of the bladed first turbine rotor 54 and the bladed second turbine rotor 60 respectively drive rotation of the first rotational assembly 46 and the second rotational assembly 48. The combusted fuel-air mixture flows from the bladed second turbine rotor 54 along the core flowpath 68 to the exhaust section 32 (e.g., the exhaust nozzle assembly 38). The combusted fuel-air mixture which enters exhaust section 32 may be referred to as "combustion exhaust gas." During operation of the propulsion system 10 of FIG. 2, air also enters the louvers 66 and is directed into a secondary flowpath 70. The secondary flowpath 70 extends through the nacelle 22 and/or the nacelle cavity 64 to the exhaust nozzle assembly 38. Air flow along the secondary flowpath 70 may be used to provide cooling to the nacelle 22, the auxiliary systems 200, and/or other systems or components of the propulsion system 10. The air within the secondary flowpath 70 may be referred to as "secondary air." The aircraft propulsion system 10 of the present disclosure, however, is not limited to the exemplary gas turbine engine configuration described above and illustrated in FIG. 2.

FIGS. 3-6 illustrate portions of the exhaust nozzle assembly 38. The exhaust nozzle assembly includes a primary nozzle 72, an outer shroud 74, an ejector nozzle 76, and an actuator 78.

The primary nozzle 72 extends circumferentially about (e.g., completely around) an axial centerline 80 of the exhaust nozzle assembly 38 of FIGS. 3-6. The axial centerline 80 may be the same as or different than the axial centerline 40 for the propulsion system 10. The primary nozzle 72 extends (e.g., axially extends) between and to a first axial end 82 (e.g., an upstream end) of the primary nozzle 72 and a second axial end 84 (e.g., a downstream end) of the primary nozzle 72, which second axial end 84 is axially downstream of the first axial end 82. The primary nozzle 72 may be mounted to the engine static structure 34 at (e.g., on, adjacent, or proximate) the first axial end 84 (see FIG. 2). For example, the first axial end 84 may be mounted an engine case (e.g., a turbine exhaust case (TEC) of the one or more engine cases 42 (see FIG. 2). The primary nozzle 72 is configured to direct the combustion exhaust gas (illustrated schematically as combustion exhaust gas 86 in FIGS. 3 and 5) from the turbine section 30 through the primary nozzle 72 toward the downstream ejector nozzle 76. The primary nozzle 72 may include a mixer 88 at (e.g., on, adjacent, or proximate) the second axial end 84. The mixer 88 may be configured, for example, as a forced mixer, a confluent mixer, or the like, however, the present disclosure is not limited to any particular configuration for the mixer 88. The mixer 88 may be configured to facilitate mixing of the combustion exhaust gas 86 with the secondary air in the exhaust nozzle assembly 38.

The outer shroud 74 extends circumferentially about (e.g., completely around) the axial centerline 80. The outer shroud 74 circumscribes the primary nozzle 72. The outer shroud 74 is radially spaced from the primary nozzle 72 to form a secondary annulus 90 radially between the primary nozzle 72 and the outer shroud 74. Secondary air (schematically illustrated as secondary air 92 in FIGS. 3 and 5) may flow from the nacelle 22 and/or the nacelle cavity 64 (see FIG. 2) and through the secondary annulus 90 toward the downstream ejector nozzle 76. The outer shroud 74 may extend (e.g., axially extend) between and to a first axial end 94 of the outer shroud 74 and a second axial end 96 of the outer shroud 76, which second axial end 96 is axially downstream of the first axial end 94. The second axial end 96 may be positioned axially upstream of the second axial end 84. The outer shroud 74 may be formed by, mounted to, or otherwise in contact with the nacelle 22.

The ejector nozzle 76 includes a nozzle body 98. The nozzle body 98 extends circumferentially about (e.g., completely around) the axial centerline 80. The nozzle body 98 is radially spaced from the primary nozzle 72 to further form the secondary annulus 90 radially between the primary nozzle 72 and the ejector nozzle 76. The nozzle body 98 extends (e.g., axially extends) between and to a first axial end 100 (e.g., an upstream end) of the ejector nozzle 76 and a second axial end 102 (e.g., a downstream end) of the ejector nozzle 76, which second axial end 102 is axially downstream of the first axial end 100. The nozzle body 98 forms and surrounds a mixing region 130 of the ejector nozzle 76. The mixing region 130 is in fluid communication with the core flowpath 68 and the secondary flowpath 70. The mixing region 130 extends axially between the second axial end 84 and the second axial end 102. The primary nozzle 72 and the nozzle body 98 form a mixing cross-sectional area 132 of the mixing region 130 at the second axial end 84. The mixing cross-sectional area 132 may be understood, for example, as an area between the primary nozzle 72 and the nozzle body 98 along a radial plane located at the second axial end 84. The second axial end 102 forms an exit plane 134 for the exhaust nozzle assembly 38. The mixing region 130 has an axial length L1 extending axially between and to the mixing cross-sectional area 132 and the exit plane 134.

Figure 3:
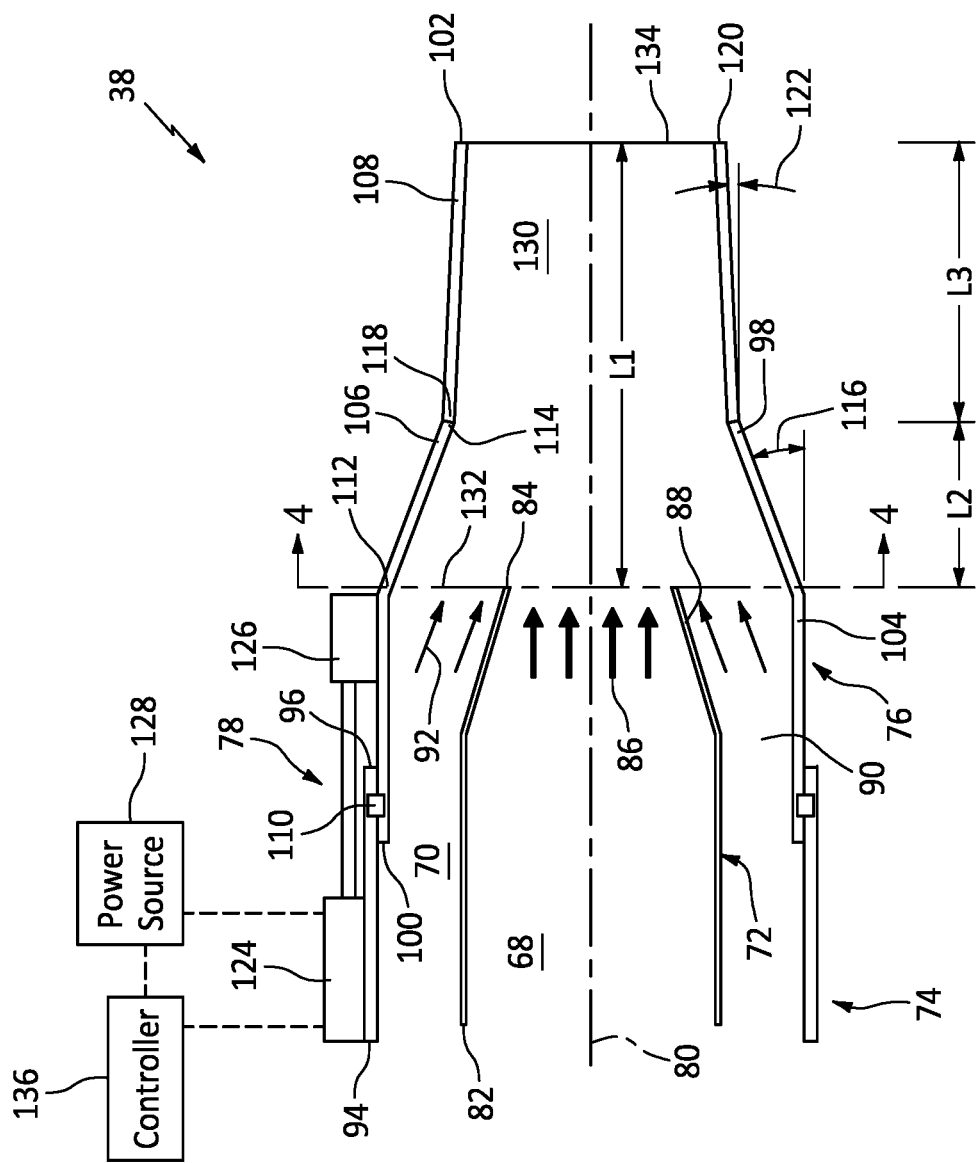
FIG. 3 illustrates a side, cutaway view of an exhaust nozzle assembly, in accordance with one or more embodiments of the present disclosure.
Figure 5:
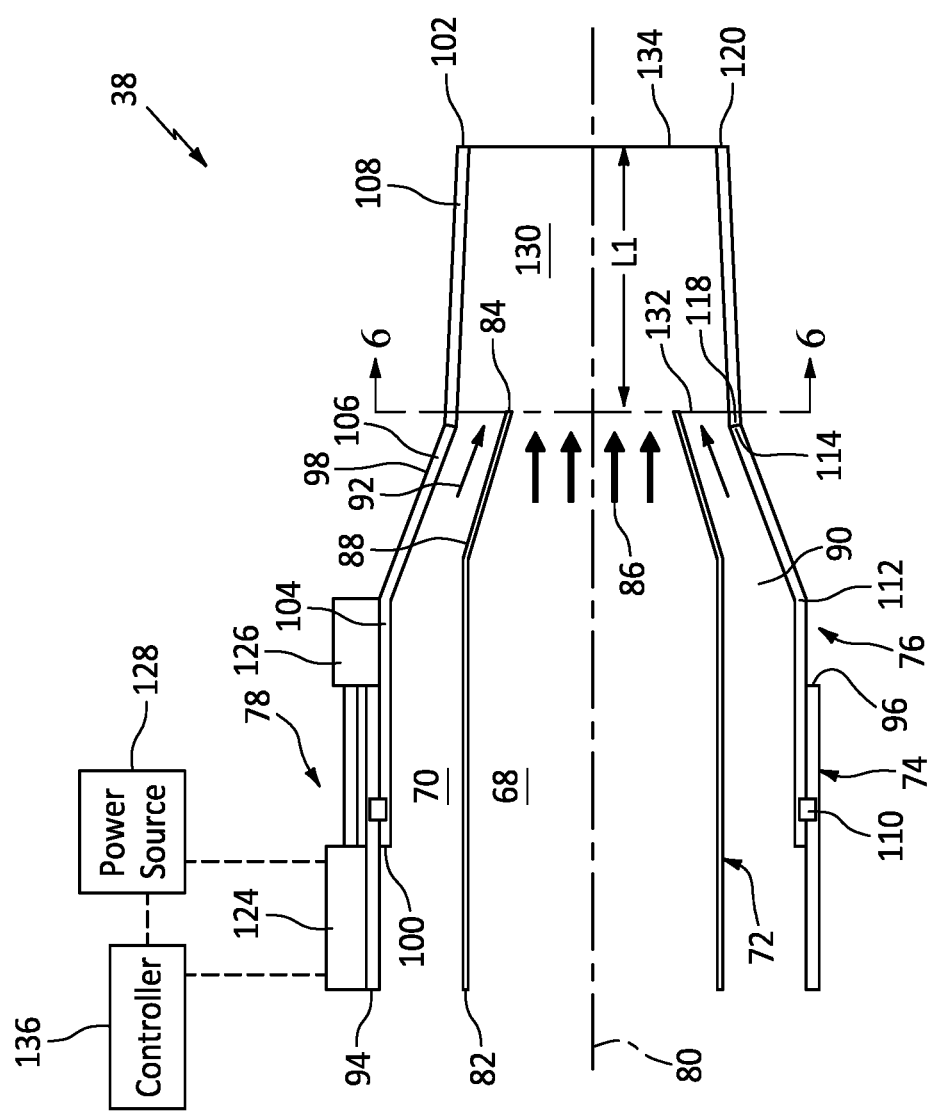
FIG. 5 illustrates a side, cutaway view of an exhaust nozzle assembly, in accordance with one or more embodiments of the present disclosure.

The nozzle body 98 of FIGS. 3 and 5 includes a sleeve portion 104, a first convergent portion 106, and a second convergent portion 108. Each of the sleeve portion 104, the first convergent portion 106, and the second convergent portion 108 are axial portions of the nozzle body 98, which axial portions extend circumferentially about (e.g., completely around) the axial centerline 80. The sleeve portion 104 of FIGS. 3 and 5 extends (e.g., axially extends) from the first axial end 100 to the first convergent portion 106. The first convergent portion 106 of FIGS. 3 and 5 extends (e.g., axially extends) from the sleeve portion 104 to the second convergent portion 108. The second convergent portion 108 of FIGS. 3 and 5 extends (e.g., axially extends) from the first convergent portion 106 to the second axial end 102. As will be discussed in further detail, any of the sleeve portion 104, the first convergent portion 106, and the second convergent portion 108 may form the mixing cross-sectional area 132 with the primary nozzle 72, depending on an axial position of the nozzle body 98 relative to the primary nozzle 72.

The sleeve portion 104 is positioned in sliding contact with the outer shroud 74. For example, the sleeve portion 104 of FIGS. 3 and 5 is configured to slide axially along the outer shroud 74 at (e.g., on, adjacent, or proximate) an interior surface of the outer shroud 74. Alternatively, the sleeve portion 104 may be configured to slide axially along the outer shroud 74 at (e.g., on, adjacent, or proximate) an exterior surface of the outer shroud 74. The sleeve portion 104 may have a cylindrical shape which extends (e.g., axially extends) from the first axial end 100 to the first convergent portion 106. The sleeve portion 104 may include a seal 110. The seal 110 may extend circumferentially about (e.g., completely around) the axial centerline 80 on the sleeve portion 104. The seal 110 may be in sliding contact with the outer shroud 74 to provide an annular fluid seal between the outer shroud and the sleeve portion 104.

The first converging portion 106 of FIGS. 3 and 5 converges radially inward in a first convergence direction from an upstream end 112 of the first converging portion 106 to a downstream end 114 of the first converging portion 106. For example, the upstream end 112 of FIGS. 3 and 5 is disposed radially outward of the downstream end 114. The first convergence direction may be defined by an average position of the first converging portion 106 from the upstream end 112 to the downstream end 114. The first converging portion 106 (e.g., the first convergence direction) is disposed at a convergence angle 116 relative to the axial centerline 80. The first converging portion 106 has an axial length L2 extending (e.g., axially extending) from the upstream end 112 to the downstream end 114.

The second converging portion 108 of FIGS. 3 and 5 converges radially inward in a second convergence direction from an upstream end 118 of the second converging portion 108 to a downstream end 120 of the second converging portion 108. For example, the upstream end 118 of FIGS. 3 and 5 is disposed radially outward of the downstream end 120. The second convergence direction may be defined by an average position of the second converging portion 108 from the upstream end 118 to the downstream end 120. The second converging portion 108 (e.g., the second convergence direction) is disposed at a convergence angle 122 relative to the axial centerline 80. The convergence angle 122 of FIGS. 3 and 5 is less than the convergence angle 116 of FIGS. 3 and 5. The second converging portion 108 has an axial length L3 extending (e.g., axially extending) from the upstream end 118 to the downstream end 120. The axial length L3 of FIGS. 3 and 5 is greater than the axial length L2.

During operation of the propulsion system 10 (see FIG. 2), the combustion exhaust gas 86 flow into and through the mixing region 130 mixes with the secondary air 92 flowing from the secondary annulus 90 into the mixing region 130 (e.g., by shear fluid friction forces). The secondary air 92 is mixed (e.g., entrained) with the relatively higher velocity combustion exhaust gas 86. Mixing of the secondary air 92 with the combustion exhaust gas 86 increases a flow rate of the secondary air through the nacelle 22 and/or the nacelle cavity 66, thereby increasing the secondary air cooling provided to the nacelle 22 as well as auxiliary systems 200 of the propulsion system 10 contained within the nacelle 22 (see FIG. 2).

The actuator 78 of FIGS. 3 and 5 includes a first actuator member 124, a second actuator member 126, and a power source 128. The first actuator member 124 is mounted to outer shroud 74 (e.g., on an exterior of the outer shroud 74) or another fixed portion of the nacelle 22 (see FIG. 2). The second actuator member 126 is mounted to the ejector nozzle 76. For example, the second actuator member 126 of FIGS. 3 and 5 is mounted on an exterior of the sleeve portion 104. The present disclosure, however, is not limited to the particular configuration of the first actuator member 124 and the second actuator member 126 of FIGS. 3 and 5. The actuator 78 may be configured as a linear actuator in which the actuator 78 is configured to effect axial movement (e.g., linear axial translation) of the second actuator member 126 relative to the first actuator member 124. The actuator 78 may be configured as a hydraulic actuator, a pneumatic actuator, an electro-mechanical actuator, a rack-and-pinion actuator, or the like, which may be configured to effect axial movement of the second actuator member 126 relative to the first actuator member 124. The power source 128 may be any power source, such as an electrical power source (e.g., a battery and/or a generator), a hydraulic power source, or a pneumatic power source (e.g., compressor bleed air), configured to facilitate axial movement of the second actuator member 126 relative to the first actuator member 124. The present disclosure, however, is not limited to the particular actuator 78 configuration illustrated in FIGS. 3 and 5.

Figure 4:
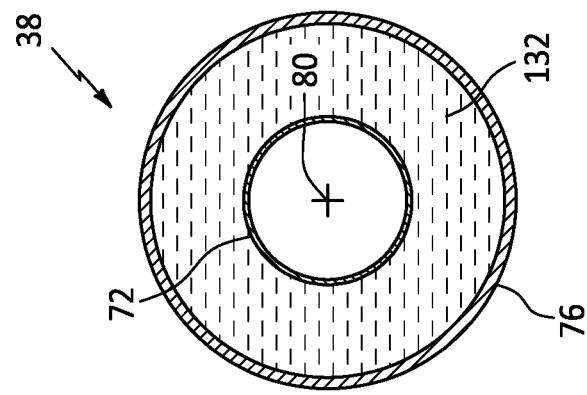
FIG. 4 illustrates a cross-sectional view of the exhaust nozzle assembly of FIG. 3 taken along Line 4-4 of FIG. 3, in accordance with one or more embodiments of the present disclosure.
Figure 6:
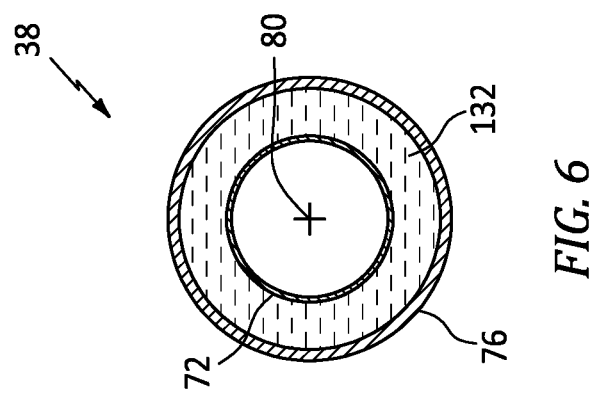
FIG. 6 illustrates a cross-sectional view of the exhaust nozzle assembly of FIG. 5 taken along Line 6-6 of FIG. 5, in accordance with one or more embodiments of the present disclosure.

The actuator 78 is configured to effect axial movement of the ejector nozzle 76 to control an axial position of the ejector nozzle 76 relative to the primary nozzle 72 and the outer shroud 74 and, therefore, to control (e.g., selectively vary) an area of the mixing cross-sectional area 132. By controlling the area of the mixing cross-sectional area 132, a flow rate of the secondary air 92 through the nacelle 22 and/or the nacelle cavity 66 (see FIG. 2) may also be controlled, thereby facilitating modulation of the secondary air 92 flow to provide sufficient secondary air cooling to the nacelle 22 and auxiliary systems 200 of the propulsion system 10 contained within the nacelle 22 (see FIG. 2) while also limiting thrust losses and aerodynamic drag for the propulsion system 10. For example, FIGS. 3 and 4 illustrate the ejector nozzle 76 in a first axial position (e.g., an aft position) relative to the primary nozzle 72 and FIGS. 5 and 6 illustrate the ejector nozzle 76 in a different second axial position (e.g., a forward position) relative to the primary nozzle 72. The area of the mixing cross-sectional area 132 of FIGS. 3 and 4 is greater than the area of the mixing cross-sectional area 132 of FIGS. 5 and 6. A greater area of the mixing cross-sectional area 132 may correspond with an increase in the flow rate of secondary air 92 through the nacelle 22 and/or the nacelle cavity 66 and into the exhaust nozzle assembly 38. The first axial position of the ejector nozzle 76 in FIGS. 3 and 4 is an axially extended position (e.g., in an axially downstream direction) of the ejector nozzle 76 relative to the second axial position of the ejector nozzle 76 in FIGS. 5 and 6.

As a result of the converging configuration of the first converging portion 106 and the second converging portion 108, axial movement of the ejector nozzle 76 relative to the primary nozzle 72 may cause the area of the mixing cross-sectional area 132 to vary. Axial movement of the ejector nozzle 76 in an axially downstream direction may cause an increase in the area of the mixing cross-sectional area 132, as well as an increase in the axial length L1 and volume of the mixing region 130. Axial movement of the ejector nozzle 76 in an axially upstream direction may cause a decrease in the area of the mixing cross-sectional area 132, as well as a decrease in the axial length L1 and volume of the mixing region 130. The lesser convergence angle 122 and greater axial length L3 of the second converging portion 108 relative to the convergence angle 116 and axial length L2 of the first converging portion 106 may facilitate greater reductions the area of the mixing cross-sectional area 132 while also facilitating a sufficient axial length L1 of the mixing region 130 for more complete mixing of the combustion exhaust gas 86 with the secondary air 92.

Referring to FIGS. 2, 3, and 5, in some embodiments, the propulsion system 10 may include a controller 136 configured to control operation of the actuator 78 for selectively positioning the ejector nozzle 76. The controller 136 of FIG. 2 includes a processor 138 and memory 140. The memory 140 is in signal communication with the processor 138. The processor 138 may include any type of computing device, computational circuit, or any type of process or processing circuit capable of executing a series of instructions that are stored in the memory 140, thereby causing the processor 138 to perform or control one or more steps or other processes. The processor 138 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 140 may represent one or more algorithms for controlling the aspects of the propulsion system 10, and the stored instructions are not limited to any particular form (e.g., program files, system data, buffers, drivers, utilities, system programs, etc.) provided they can be executed by the processor 138. The memory 140 may be a non-transitory computer readable storage medium configured to store instructions that when executed by one or more processors, cause the one or more processors to perform or cause the performance of certain functions. The memory 140 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 136 may be achieved via the use of hardware, software, firmware, or any combination thereof. The controller 136 may also include input and output devices (e.g., keyboards, buttons, switches, touch screens, video monitors, sensor readouts, data ports, etc.) that enable the operator to input instructions, receive data, etc.

The controller 136 may form or otherwise be part of an electronic engine controller (EEC) for the propulsion system 10. The EEC may control operating parameters of the gas turbine engine 20 including, but not limited to, fuel flow, stator vane position, compressor air bleed valve position, etc. so as to control an engine power and/or thrust of the gas turbine engine 20. In some embodiments, the EEC may be part of a full authority digital engine control (FADEC) system for the gas turbine engine 20.

The controller 136 may be in communication (e.g., signal communication) with one or more sensors of the propulsion system 10. For example, the controller 136 may be in signal communication with one or more temperature sensors 142 disposed on or within the nacelle 22. The temperature sensors 142 may be configured to measure temperatures of the nacelle 22 and/or one or more auxiliary systems 200 of the propulsion system 10 housed within the nacelle 22. The temperature sensors 142 may additionally or alternatively be configured to measure temperatures of the secondary air 92 within the nacelle 22, the nacelle cavity 66, and/or the exhaust nozzle assembly 38. The memory 140 may include instructions which, when executed by the processor 138, cause the controller 136 and/or its processor 138 to control a position of the ejector nozzle 76 (e.g., with the actuator 78) to control a temperature of the nacelle 22 and/or auxiliary systems 200 (hereinafter a "nacelle temperature"), as measured by the temperature sensors 142. For example, the controller 136 may be configured to control a position of the ejector nozzle 76 and, hence, an area of the mixing cross-sectional area 130, to maintain the nacelle temperature within a predetermined temperature range. The controller 136 may be configured to identify that a high-temperature condition is present or absent based on a first predetermined threshold value of the nacelle temperature. The controller 136 may be configured to increase an area of the mixing cross-sectional area 132 in response to the nacelle temperature (e.g., measured by the temperature sensor(s) 142) increasing to or above the first predetermined threshold value, thereby increasing the flow rate of secondary air 92 through the nacelle 22 and/or the nacelle cavity 66. The controller 136 may be configured to identify that a low-temperature condition is present or absent based on a second predetermined threshold value of the nacelle temperature. The controller 136 may be configured to decrease an area of the mixing cross-sectional area 132 in response to the nacelle temperature (e.g., measured by the temperature sensor(s) 142) decreasing to or below the second predetermined threshold value, thereby improving performance and/or efficiency of the gas turbine engine 20.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A propulsion system comprising:
a primary nozzle extending along an exhaust centerline of the propulsion system, the primary nozzle including a downstream axial end;
an outer shroud surrounding the primary nozzle, the outer shroud forming a secondary annulus between the primary nozzle and the outer shroud;
an ejector nozzle including a tubular nozzle body, the tubular nozzle body extending axially between and to a first axial end of the tubular nozzle body and a second axial end of the tubular nozzle body, the tubular nozzle body extends circumferentially about the exhaust centerline from the first axial end to the second axial end, the first axial end disposed at the outer shroud, the second axial end disposed downstream of the first axial end, the second axial end forming a nozzle exit plane for the exhaust nozzle assembly, the tubular nozzle body forms a first converging portion and a second converging portion of the tubular nozzle body, the first converging portion and the second converging portion extend circumferentially about the exhaust centerline, the second converging portion is directly connected to and fixed relative to the first converging portion, the second converging portion extends axially between and to the first converging portion and the second axial end, the tubular nozzle body forming a mixing cross-sectional area between the primary nozzle and the tubular nozzle body at the downstream axial end; and
an actuator mounted on the tubular nozzle body, the actuator configured to axially translate the tubular nozzle body between a first axial position and a second axial position, relative to the outer shroud, to control an area of the mixing cross-sectional area, the mixing cross-sectional area having a first area with the tubular nozzle body in the first axial position and a second area with the tubular nozzle body in the second axial position, the first area greater than the second area.

2. The propulsion system of claim 1, wherein the first converging portion has a first fixed convergence angle relative to the exhaust centerline, the second converging portion has a second fixed convergence angle relative to the exhaust centerline, and the second fixed convergence angle different than the first fixed convergence angle.

3. The propulsion system of claim 2, wherein the first converging portion forms the mixing cross-sectional area with the tubular nozzle body in the first axial position.

4. The propulsion system of claim 2, wherein the second converging portion forms the mixing cross-sectional area with the tubular nozzle body in the second axial position.

5. The propulsion system of claim 2, wherein the tubular nozzle body further forms a cylindrical sleeve portion extending between and to the first axial end and the first converging portion, the cylindrical sleeve portion extends circumferentially about the exhaust centerline, the cylindrical sleeve portion configured to slidingly contact the outer shroud as the tubular nozzle body axially translates between the first axial position and the second axial position.

6. The propulsion system of claim 2, wherein the second fixed convergence angle is less than the first fixed convergence angle.

7. The propulsion system of claim 2, wherein the first converging portion has a first axial length and the second converging portion has a second axial length, the second axial length greater than the first axial length.

8. The propulsion system of claim 1, wherein the actuator is additionally mounted on the outer shroud.

9. The propulsion system of claim 1, further comprising a controller, the controller including a processor in communication with a non-transitory memory storing instructions, which instructions when executed by the processor, cause the processor to control the actuator to axially translate the tubular nozzle body.

10. The propulsion system of claim 9, wherein the instructions, when executed by the processor, further cause the processor to control the actuator based on a measured temperature of the propulsion system.

11. A propulsion system comprising:
a gas turbine engine extending along an axial centerline of the propulsion system, the gas turbine engine including a core flowpath;
a nacelle housing the gas turbine engine, the nacelle forming a nacelle cavity between the gas turbine engine and the nacelle, the nacelle cavity forming a secondary flowpath; and
an exhaust nozzle assembly including a primary nozzle, an outer shroud, and an ejector nozzle, the primary nozzle including a downstream axial end, the primary nozzle forming the core flowpath, the outer shroud surrounding the primary nozzle, the outer shroud forming a secondary annulus between the primary nozzle and the outer shroud, the secondary flowpath including the secondary annulus, the ejector nozzle mounted to the outer shroud, the ejector nozzle including a nozzle body extending between and to a first axial end of the nozzle body and a second axial end of the nozzle body, the nozzle body extends circumferentially about the axial centerline from the first axial end to the second axial end, nozzle body forms a first converging portion and a second converging portion of the nozzle body, the first converging portion and the second converging portion extend circumferentially about the axial centerline, the second converging portion is directly connected to and fixed relative to the first converging portion, the second converging portion extends axially between and to the first converging portion and the second axial end, the nozzle body forming a mixing cross-sectional area between the primary nozzle and the nozzle body at the downstream axial end, the nozzle body further forming a mixing region extending axially from the mixing cross-sectional area to the second axial end, the mixing region in fluid communication with the core flowpath and the secondary flowpath, the nozzle body configured to axially translate relative to the outer shroud to vary an area of the mixing cross-sectional area and an axial length of the mixing region.

12. The propulsion system of claim 11, wherein the first converging portion has a first fixed convergence angle relative to the axial centerline, the second converging portion has a second fixed convergence angle relative to the axial centerline, the second fixed convergence angle different than the first fixed convergence angle.

13. The propulsion system of claim 12, wherein the second fixed convergence angle is less than the first fixed convergence angle.

14. The propulsion system of claim 12, wherein the first converging portion has a first axial length and the second converging portion has a second axial length, the second axial length greater than the first axial length.

15. The propulsion system of claim 11, wherein the nozzle body is positionable in a forward axial position and an aft axial position, wherein the mixing cross-sectional area has a first area with the nozzle body in the forward axial position and a second area with the nozzle body in the aft axial position, and wherein the second area is greater than the first area.

16. The propulsion system of claim 11, wherein the exhaust nozzle assembly further includes an actuator mounted on the nozzle body, the actuator configured to axially translate the nozzle body between a forward axial position and an aft axial position to control the area of the mixing cross-sectional area.

17. A propulsion system comprising:

a primary nozzle extending along an exhaust centerline of the propulsion system, the primary nozzle including a downstream axial end;

an ejector nozzle including a tubular nozzle body extending axially between and to a first axial end of the tubular nozzle body and a second axial end of the tubular nozzle body, the second axial end disposed downstream of the first axial end, the second axial end forming a nozzle exit plane for the exhaust nozzle assembly, the tubular nozzle body forms a first converging portion and a second converging portion of the tubular nozzle body, the first converging portion and the second converging portion extend circumferentially about the exhaust centerline, the second converging portion is directly connected to and fixed relative to the first converging portion, the second converging portion extends axially between and to the first converging portion and the second axial end, the tubular nozzle body forming a mixing cross-sectional area between the primary nozzle and the tubular nozzle body at the downstream axial end; and an actuator mounted on the tubular nozzle body, the actuator configured to axially translate the first converging portion and the second converging portion of the tubular nozzle body between a forward axial position and an aft axial position, relative to the primary nozzle, to control an area of the mixing cross-sectional area, the mixing cross-sectional area having a first area with the tubular nozzle body in the forward axial position and a second area with the tubular nozzle body in the aft axial position, the second area greater than the first area.

18. The propulsion system of claim 17, wherein the tubular nozzle body converges in a direction from the first axial end to the second axial end.

19. The propulsion system of claim 17, wherein the first converging portion has a first convergence angle relative to the exhaust centerline the second converging portion has a second convergence angle relative to the exhaust centerline, the second convergence angle different than the first convergence angle.

20. The propulsion system of claim 17, wherein the first converging portion forms the mixing cross-sectional area with the tubular nozzle body in the aft axial position and the second converging portion forms the mixing cross-sectional area with the tubular nozzle body in the forward axial position.

* * * * *